United States Patent

[11] 3,565,144

| [72] | Inventor | Gustaaf Gaston Annemans<br>Madelie Fjesstraat 25, Schaerbeek,<br>Belgium |
|---|---|---|
| [21] | Appl. No. | 728,015 |
| [22] | Filed | May 9, 1968 |
| [45] | Patented | Feb. 23, 1971 |
| [32] | Priority | May 11, 1967, Mar. 7, 1968 |
| [33] | | Belgium |
| [31] | | 698,334 and 55473 |

[54] APPARATUS FOR CUTTING UP TUBERS
3 Claims, 13 Drawing Figs.

[52] U.S. Cl. .................................................. 146/106
[51] Int. Cl. .................................................. A47j 17/00
[50] Field of Search .......................................... 146/106, 169

[56] References Cited
UNITED STATES PATENTS
2,741,285  4/1956  Lee .............................. 146/106
2,742,069  4/1956  Lum ............................. 146/106
3,112,781  12/1963  Popeil .......................... 146/169
3,327,621  6/1967  Zysset .......................... 146/169X FOREIGN PATENTS
83,074  5/1919  Switzerland ................... 146/169

Primary Examiner—Andrew R. Juhasz
Assistant Examiner—Z. R. Bilinsky
Attorney—Sughrue, Rothwell, Mion, Zinn & Macpeak ABSTRACT: An apparatus is described for cutting up tubers, more particularly potatoes into small portions to be thrown in boiling fat for cooking, which is provided with one or more cutting members, able to carry out a rotation through an angle of 360°, thus describing a surface of revolution and consequently cutting small corresponding bodies of revolution in a tuber, the cutting member or members being actuated by a rack with a reciprocal motion which meshes with a pinion fitted on the rotary shaft of the said cutting member.

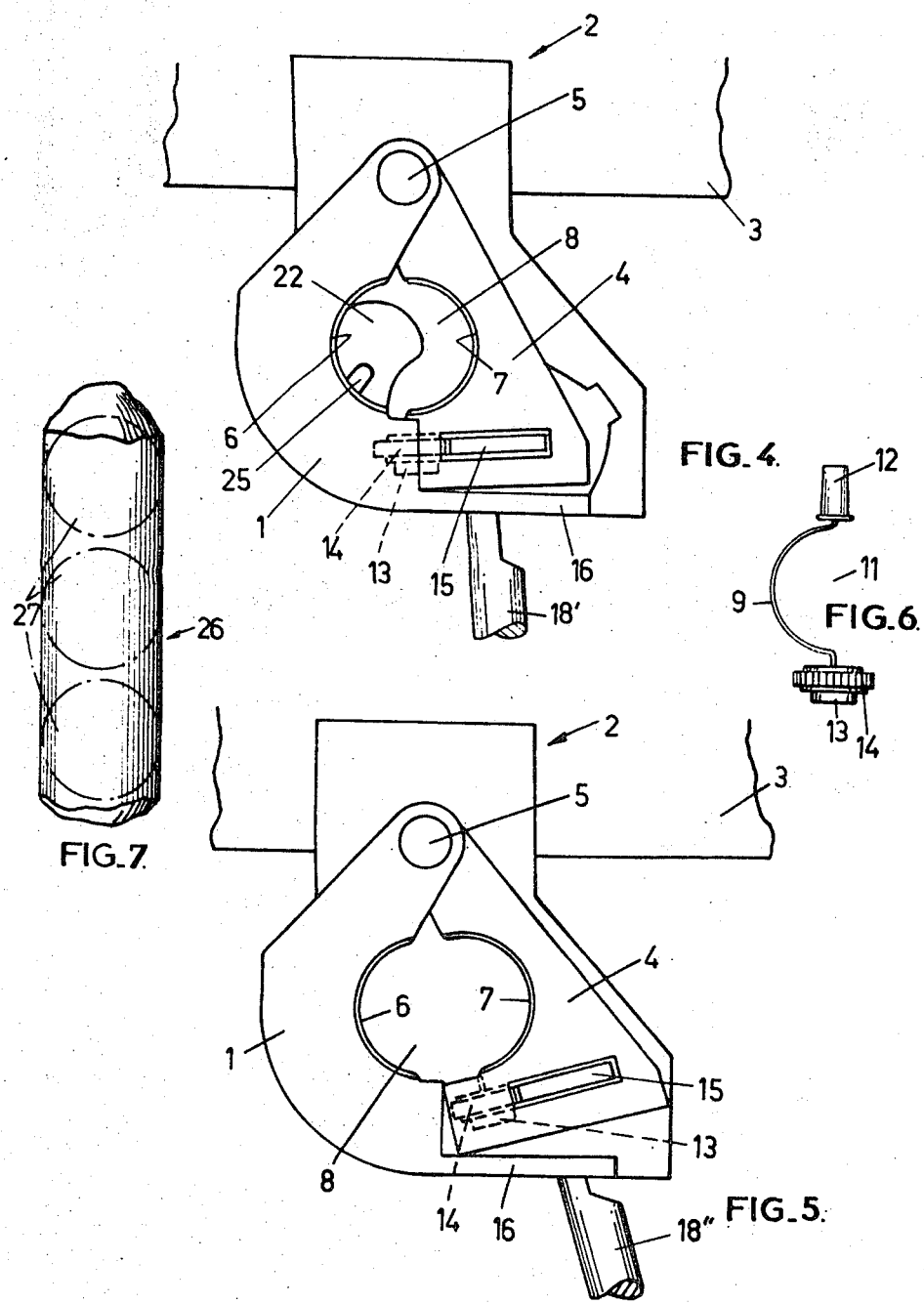

APPARATUS FOR CUTTING UP TUBERS

The present invention relates to an apparatus for cutting up tubers, more particularly potatoes, in order to cut off small portions therefrom, usually termed "nuts" which are thrown in boiling fat for cooking.

Up to the present a small spoon in the shape of a semispherical surface with cutting edges was used for cutting up these small portions of potatoes. It is well nigh impossible to provide, by means of the said tool, small portions of uniform size. Moreover, on account of the hardness of the potatoes, cutting up these portions calls for a fairly considerable effort, tedious when large quantities of potatoes have to be cut for frying, as in the case in restaurants for example.

This method of procedure has the further disadvantage of requiring a lot of time.

The invention has for its object to overcome the said disadvantages and to provide an apparatus making it possible to produce rapidly and in a simple manner potato portions of uniform size and satisfactory appearance.

For that purpose, the apparatus according to the invention is provided with one or more cutting members, able to carry out a rotation through an angle to 360° within the space surrounding a shaft, cutting member, which for a rotation through 360° describes a surface of revolution and consequently cutting small portions in the shape of corresponding bodies of revolution in a tuber.

In an advantageous manner, the cutting member comprises a knife extending along an arc, such as a semi-arc of a circle which, knife is able to rotate through an angle of 360° about the ends thereof.

In an advantageous embodiment of the invention the cutting member is actuated by a rack with a reciprocal motion which meshes with a pinion fitted on the rotary shaft of the cutting member.

Other features and advantages of the invention will become apparent from the description given hereinafter of some particular forms of embodiment of an apparatus according to the invention for cutting up small portions of tubers, particularly of potatoes, this description being given by way of example only and not limiting the invention. The reference numerals relate to the accompanying drawings.

FIG. 4 is a plane view of the apparatus shown in the preceding figures, but in another position.

FIG. 5 is a plane view of the apparatus shown in the preceding figures, but in still another position.

FIG. 6 depicts a detail of a specific member of the apparatus shown in the preceding figures.

FIG. 7 is an elevational view of part of a tuber, wherein cut off portions are shown in chain dotted lines.

In the different FIGS. the same reference numerals refer to identical or similar components.

Figure 1:
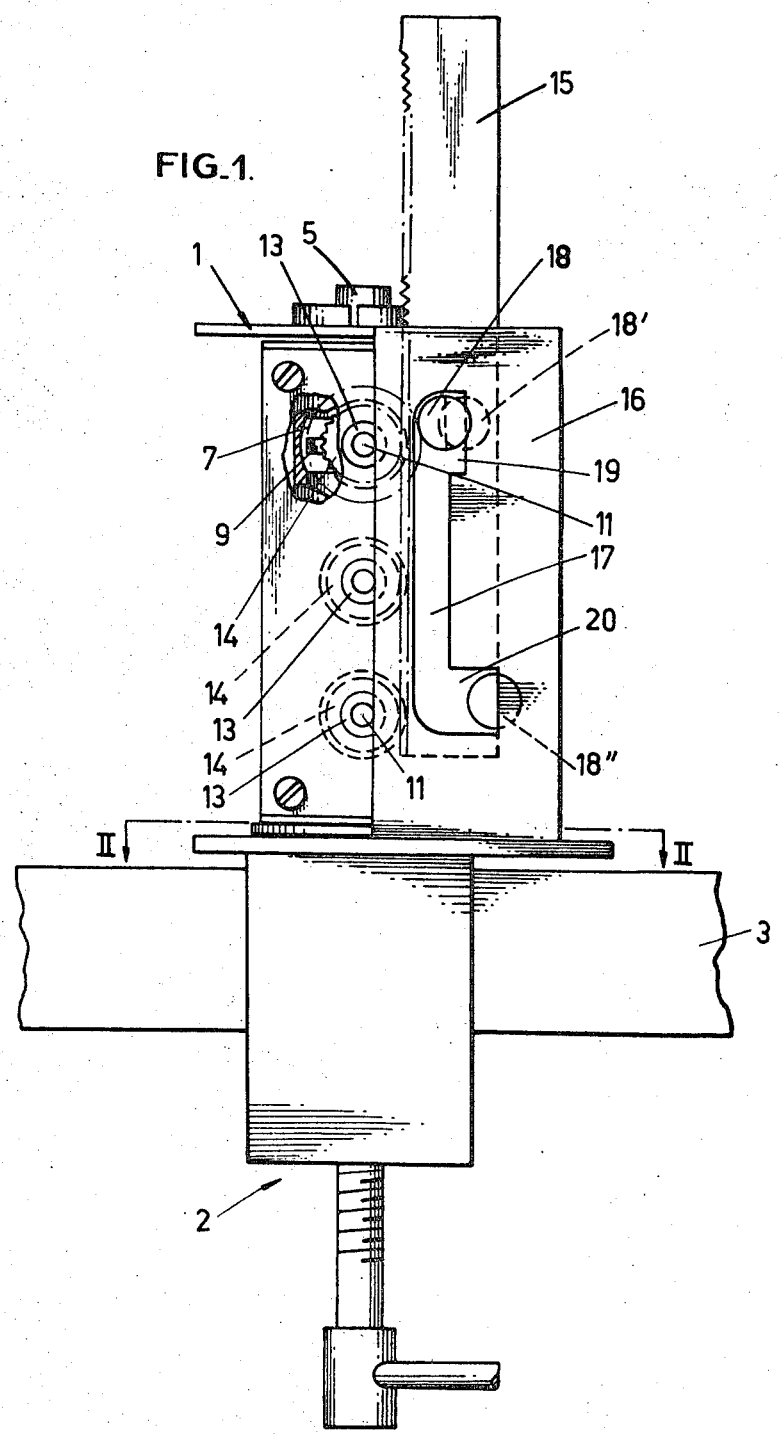
FIG. 1 is a front view partially in section, of an apparatus mounted on a table, in accordance with a first form of embodiment of the invention, to be used for cutting up tubers, in particular potatoes, into small pieces.

The apparatus shown in the FIGS. to be used for cutting off small portions of tubers, in particular of potatoes, comprises substantially a first part 1, mounted on the edge of a table 3 by means of a fastening device 2, and a second part 4 able to swivel around a vertical shaft 5 with reference to the first part 1.

The sides of these two parts 1 and 4 face one another and have inclined walls 6 and 7 fitting together, the inside faces thereof being curved over their entire height according to a half-cylinder, thus determining inbetween them a cylindrical space 8.

Figure 2:
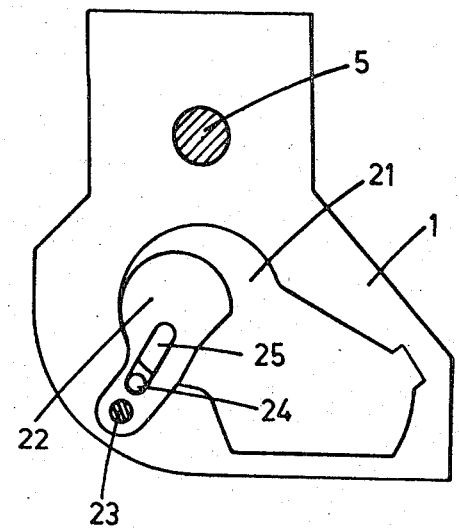
FIG. 2 is a sectional view along line II–II of FIG. 1.
Figure 3:
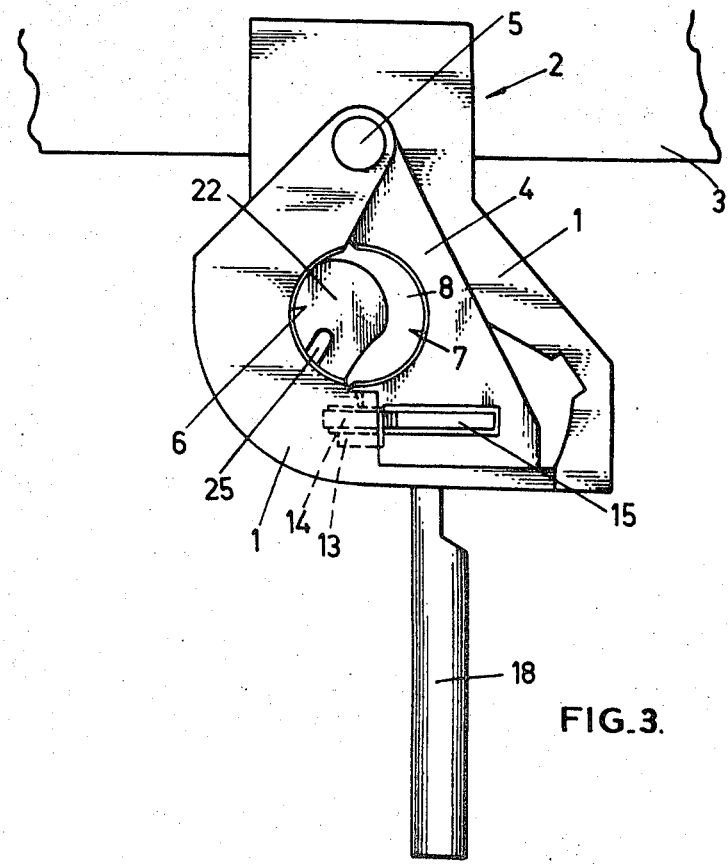
FIG. 3 is a plane view of the apparatus shown in FIGS. 1 and 2.

On the curved wall 7 of the movable part 4 are fitted three knives 9 (see FIG. 6) which extend along a semi-arc of a circle, of substantially the same curvature as the wall 7 and, when in the position at rest corresponding to that depicted in the FIGS. 1 through 3, each one is retracted in horizontal annular cavities 10 provided in the walls 6 and 7, so that, in that particular position, the space 8 is entirely clear.

The knives 9 may rotate through an angle of 360° around an horizontal shaft 11 and are provided at both their ends with small rollers 12 and 13, fitted inside corresponding openings of the wall 7 wherein they are able to rotate. On the small roller 13 is fastened a pinion 14 which meshes with a rack 15 provided with a vertical reciprocal motion within the part 4.

In the apparatus shown in the FIGS. 1 through 7, which depict a first from of embodiment, the movable part 4 is covered in part by a plate 16 of the stationary part 1. In this plate 16 is provided a groove 17, running parallel to the rack 15 and wherein is guided a handle 18, fastened to the rack 15 when the parts 1 and 4 are brought close together, as depicted in FIGS. 1 through 3.

The groove 17 is provided at both ends thereof with side notches 19 and 20 of different depths, which permit, when introducing the handle 18 in one of them, to impart an angular displacement around the shaft 5 to the part 4, so that the space 8 is enlarged.

In the course of the displacement of the handle 18 in the said groove 17, between the two ends thereof and according to a reciprocal motion, the knives 9 describe a spherical surface when carrying out their rotation through 360° around the shaft 11. The knives 9 are positioned inside the said cavities both in the top position of the handle 18, depicted in FIG. 1, as well as in the bottom position thereof.

In the bottom part of the space 8 is provided a discharge opening 21 which may be sealed by a movable projection 22. The latter may rotate around a pin 23, stationary with reference to the part 4, and is guided by a tenon 24 fitted on the part 1 and positioned in a groove 25 provided in the projection 22. In this manner, on introducing the handle 18 in the shallower notch 19, in the position shown in a dash line 18' in FIG. 1, the part 4 is drawn away from the part 1 by a rotation around the shaft 5, while the projection 22 still covers in part the discharge opening 21. FIG. 4 shows a plane view of this position.

In this position, a piece 26 (see FIG. 7) of cylindrical shape cut off beforehand from a potato, may be easily introduced in the space 8 where it is held by the projection 22.

On the other hand, if the handle 18 is introduced in the deeper notch 20, position shown in dash lines in FIG. 1 bearing the reference numeral 18'', the angular displacement of the part 4 is larger than when the handle is in the position 18' and the projection 22 completely clears the discharge opening 21. FIG. 5 shows a plane view of this position. This allows the automatic discharge from the space 8 of a residual piece of tuber out of which small spherically shaped pieces 27 were cut by means of the knives 9; these small pieces 27 are depicted in FIG. 7 in dash and dot lines.

In practice, according to the invention, the operation is carried out as follows: the potatoes are divided by means of a special tool or of special equipment into sticks or cylindrical portions 26 of a specific diameter corresponding to the diameter of the space 8 when the parts 1 and 4 are brought one against the other, i.e. in the position shown in FIGS. 1 through 3.

This special equipment may comprise, for example, a grid built up from curved metal strips crossing one another and determining circular openings. The potato is forced by a lever through the said grid so as to be divided in a run of cylindrically shaped portions 26.

These pieces 26 are subsequently introduced one by one inside the space 8. In order that this may easily be carried out, the handle 18 is set in the position 18' in such a manner that the part 4 takes up the position shown in FIG. 4. Afterwards the handle 18 is positioned in the position shown in FIG. 1, so that the cylindrically shaped tuber piece 26 is surrounded by the walls 6 and 7 of the parts 1 and 4. The following operation comprises lowering the handle 18 in the groove 17 down to the lowest point of this groove, so that the knives 9 carry out a rotary motion through an angle of 360° and thereby cut off small spherically shaped portions 27 out of part 26 of the tuber. In order to expel the cut up part of tuber through the discharge opening 21, the handle is positioned in the position 18'', which results in part 4 and projection 22 being brought to the position depicted in FIG. 5. The discharge opening 21 is released and the tuber part drops automatically out of the apparatus.

Figure 8:
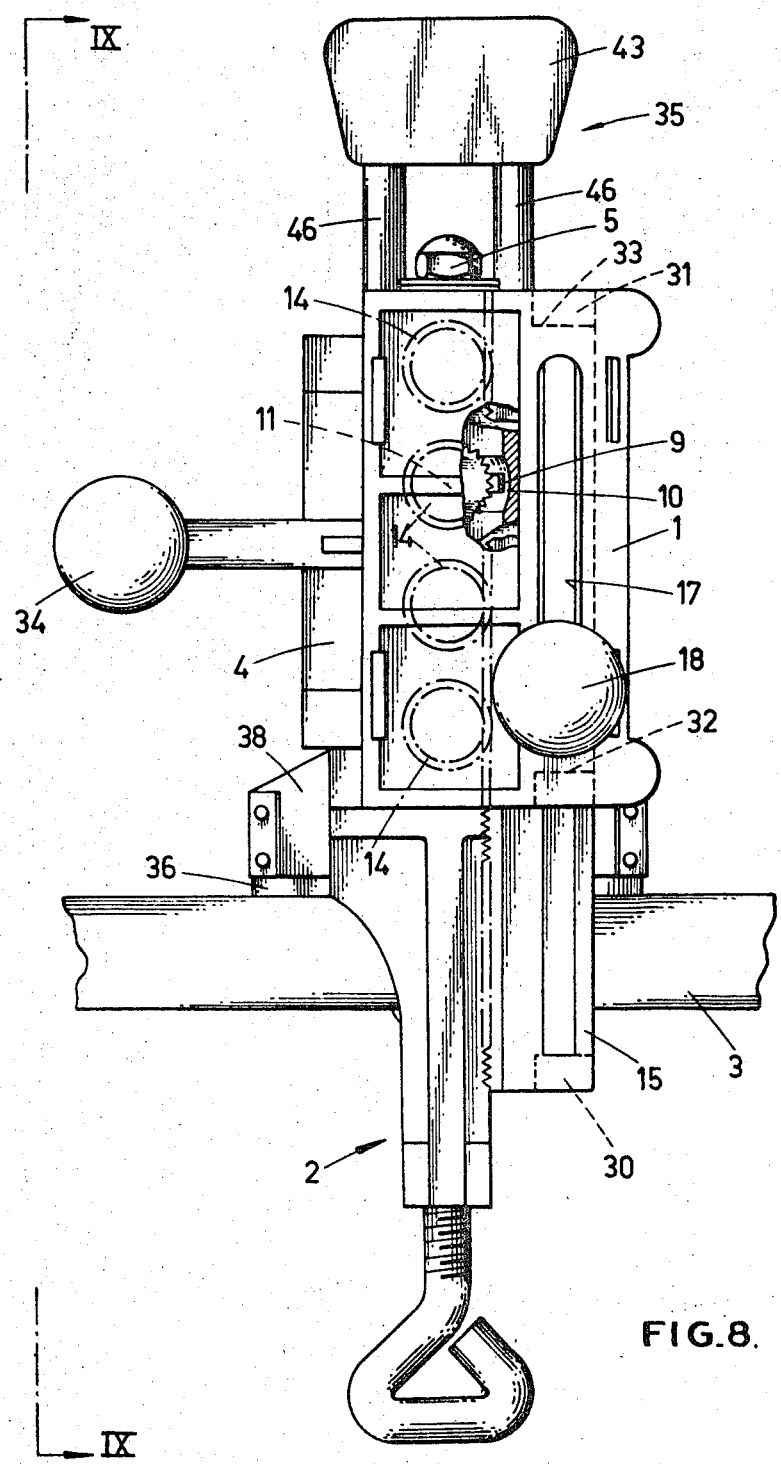
FIG. 8 is a front view partially in section, of an apparatus according to a second form of embodiment of the invention in the closed position.
Figure 9:
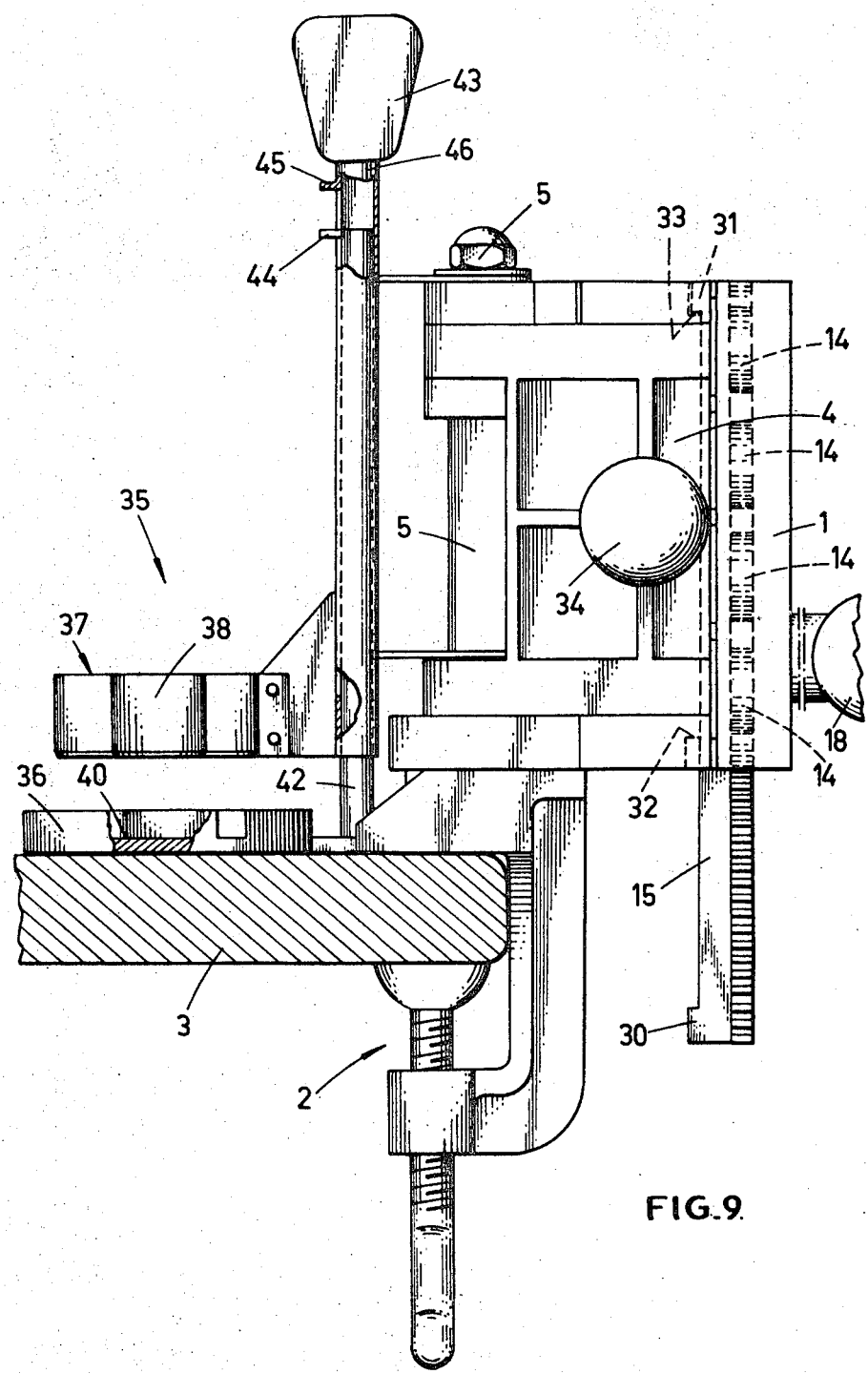
FIG. 9 is a side view along line IX–IX of figure 8.
Figure 10:
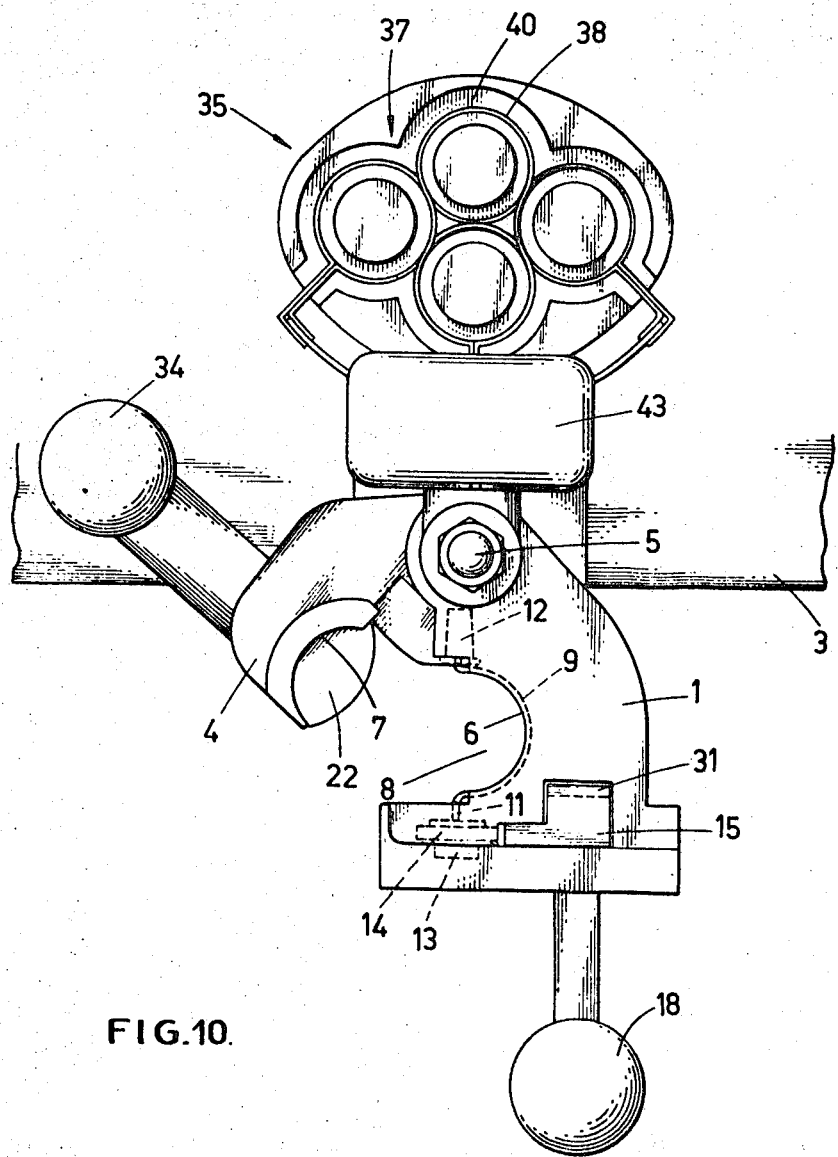
FIG. 10 is a plane view of an apparatus according to FIGS. 8 and 9, depicted in the open position.

FIGS. 8 through 10 show a second from of embodiment of the apparatus according to the invention.

As shown in FIG. 10, this apparatus differs, as regards the construction thereof, from the apparatus shown in the FIGS. 1 through 6 by the fact that part 4 thereof may be withdrawn with reference to the stationary part 1 by rotation around the shaft 5, so that the space 8 is, on the one hand, easily accessible for cleaning the apparatus and, on the other hand, permits of easy and fast withdrawal of the cut up small pieces of tuber from the space 8.

In the closed position the movable part 4 is covered by the part 1.

In the part 1 is provided a vertical groove 17 in front thereof moves a rack 15. A handle 18 extending across the said groove 17 is provided on the rack 15 and permits moving the latter in an ascending and descending motion.

At both ends of the rack 15 are provided stop members 30 and 31, which, in one of the end positions of the rack 15, abut respectively against the stops 32 and 33 provided on the part 1.

When moving the rack 15 between the said end positions by means of the handle 18, the knives 9 shall determine, when rotating through 360° around the shaft 11, a spherical surface the radius is the radius of curvature of the knives.

On the rotary part 4, in the bottom portion of the space 8, is provided a support 22, stationary with reference to this part 4, whereon rests, during the cutting into small pieces, the tuber introduced in the space 8. On opening the apparatus, the support 22 will therefore move with the rotary portion 4, so that the space 8 is set free in the bottom portion thereof and that the small pieces of the cut up tuber fall automatically therefrom. FIG. 10 shows a plane view of this position.

In the closed portion of the apparatus, i.e. when the two parts 1 and 4 have been brought against one another, the support 22 seals off space 8 at the basis thereof and a tuber cut in the shape of a stick rests on this support 22.

In order that the apparatus be opened and closed more easily a handle 34 is fastened on part 4.

At the rear part of the apparatus is provided an equipment 35 for cutting up the tubers into sticks with a cross-sectional diameter substantially the same as that of the space 8, which are to be introduced in the space 8 in order to be cut up into small spherical portions.

This equipment 35 is provided with a stationary horizontal seat 36, whereon is laid the tuber to be cut up and a punch 37, which is able to be moved in the vertical direction in a reciprocal motion with reference to the said seat and is forced through the tuber.

This punch 37 is made up of cutting blades 38, which cross one another and determine circular openings 39 with a diameter equal to that of the said cylindrical space 8 of the apparatus.

Grooves 40 facing the blades 38 are provided in the face of the seat 36 directed towards the punch 37, grooves wherein the said blades are partially embedded when the punch 37 is applied on the seat 36, so that a tuber positioned on the later is easily cut up completely.

The punch 37 may move with the two vertical tubes 46 which slide along corresponding vertical guide rods 42, in the top portion thereof is provided a handle 43 for displacing the punch 37 in the upwards and downwards direction.

On the inside wall of the tubes 46 and 46' and on the guide rods 42 are provided stop members 44 and 45, corresponding to one another, which, when the punch 37 is in the top position thereof, are applied one against the other and prevent the tubes 46 and 46' from leaving their corresponding guide rods 42.

Figure 11:
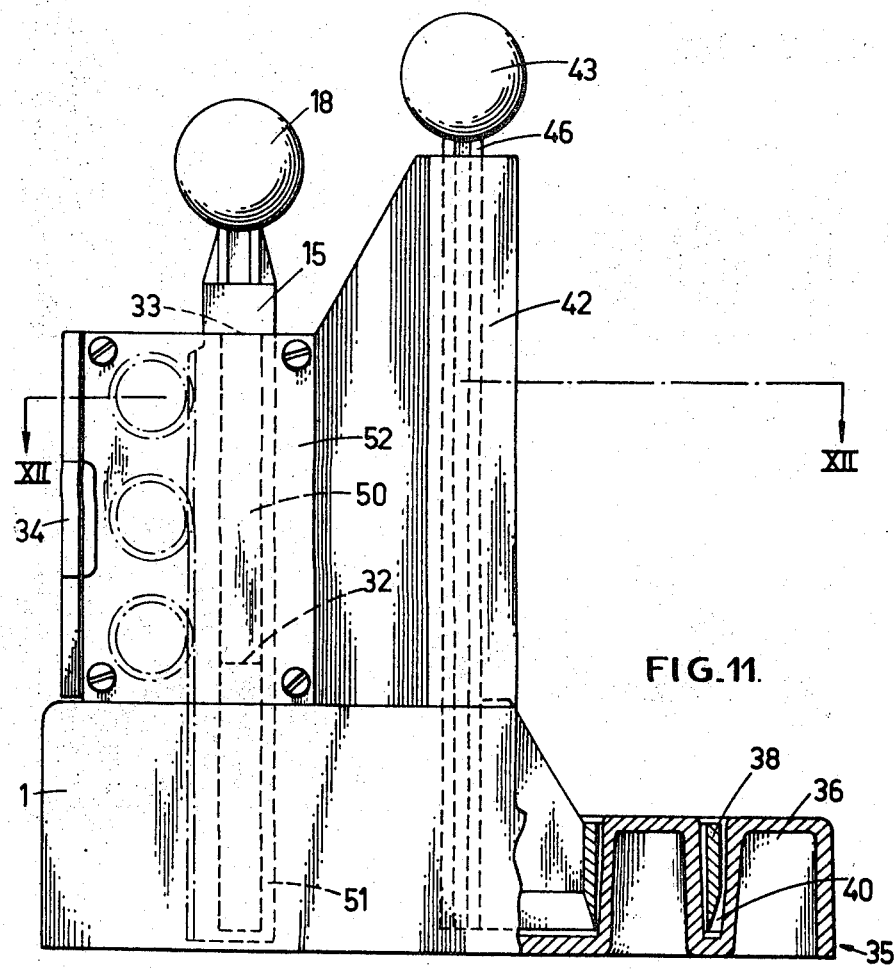
FIG. 11 is a front view partially in section, of an apparatus according to a third form of embodiment of the invention.
Figure 12:
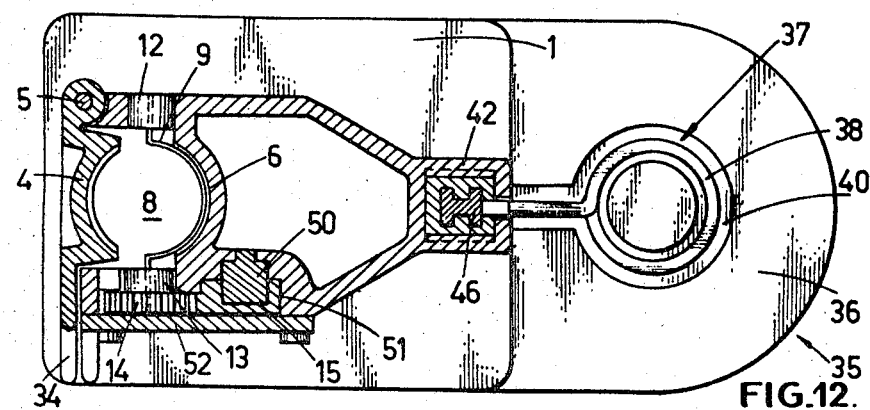
FIG. 12 is a sectional view along line XII–XII of FIG. 11.
Figure 13:
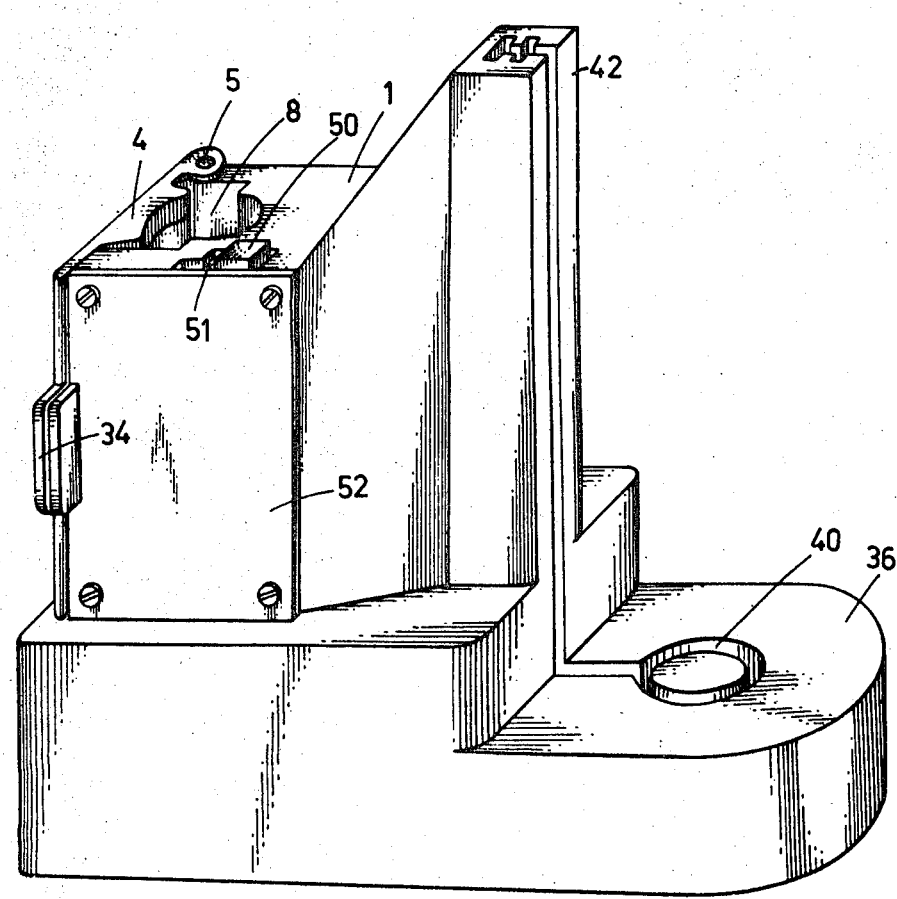
FIG. 13 is a view in perspective of the frame of the apparatus according to the FIGS. 11 and 12.

The FIGS. 11 through 13 show a third form of embodiment of the apparatus according to the invention which may be produced in a very simple and economic manner by injection moulding of plastic material.

The frame shown in FIG. 13 is produced by injection moulding in one piece and comprises the stationary part of the actual apparatus and the seat 36 of the equipment 35 for cutting up the tubers into sticks.

This frame merely rests on the working table and, contrary to the other forms of embodiment described, need not be fastened to such table.

The equipment 35 according to the FIGS. 11 through 13 is designed to cut up only one stick at each operation from a tuber. This limits the tuber losses to a minimum.

The rack 15 may be raised and lowered on a guide batten 50 fastened in a groove 51 of the stationary part 1, the groove 51 being protected by a cover plate 52. The ends of the guide batten 50 provide the stops 32 and 33 respectively.

Lastly, the part 4 is reduced to a small door which may rotate around the shaft 5 and thus seal off the space 8, permitting the easy withdrawal of the cut up tubers from the said space.

It will be understood that the invention is in no way limited to the forms of embodiment described and that many changes may be envisaged without departing from the scope of the present patent application.

Thus the shape of the knives and their drive system may be changed. Also, several spaces provided with knives rotating inside them may be arranged.

I claim:

1. An apparatus for cutting tubers, particularly potatoes, into spherical shapes, comprising:
    a. a base member having at least one planar surface;
    b. an article holder mounted at its lower end to the base member and being perpendicular thereto, said holder comprising two sections hinged together whose inner walls, in a closed position, define a substantially cylindrical chamber;
    c. a retaining member mounted on one of the holder sections at the lower end thereof for partially closing off the lower end of the chamber to retain a tuber piece therein in operative position when the holder is closed;
    d. a semicircular cutting member for having axially aligned pintles extending over a diameter of the cutting member and mounted for rotation in the holder;
    e. a recess in the wall of the holder for receiving the cutting member in a rest position;
    f. a pinion fitting on one of the pintles;
    g. a rack slideably mounted on the holder parallel to the longitudinal axis thereof and meshing with the pinion; and
    h. a handle mounted on the rack for actuating the latter with an axial motion perpendicular to the base for rotating the pinion and the cutting member about the diameter.

2. An apparatus as defined in claim 1 further comprising a longitudinal guide slot in the holder through which the rack handle projects, the guide slot having notches at each end into which the rack handle may be moved to partially open the hinged section of the holder, thereby facilitating the insertion and removal of tuber pieces into and out of the chamber.

3. An apparatus as defined in claim 1 further comprising a longitudinal guide slot in the holder through which the rack handle projects, the guide slot having notches at each end into which the rack handle may be moved to partially open the hinged sections of the holder, thereby facilitating the insertion and removal of tuber pieces into and out of the chamber.